(12) United States Patent
Mayr et al.

(10) Patent No.: US 9,068,660 B2
(45) Date of Patent: Jun. 30, 2015

(54) VALVE DEVICE WITH A FLOW GUIDING DEVICE

(71) Applicant: ZF Friedrichshafen AG, Friedrichshafen (DE)

(72) Inventors: Karlheinz Mayr, Bregenz (AT); Markus Moosmann, Gruenkraut (DE); Frank Hamma, Oberteuringen (DE); Hubert Remmlinger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 125 days.

(21) Appl. No.: 13/946,013

(22) Filed: Jul. 19, 2013

(65) Prior Publication Data

US 2014/0026995 A1 Jan. 30, 2014

(30) Foreign Application Priority Data

Jul. 26, 2012 (DE) .......................... 10 2012 213 112

(51) Int. Cl.
| | |
|---|---|
| *F16K 1/38* | (2006.01) |
| *F16K 47/12* | (2006.01) |
| *F16K 1/34* | (2006.01) |
| *F16K 47/08* | (2006.01) |
| *F16K 31/06* | (2006.01) |

(52) U.S. Cl.
CPC . *F16K 1/34* (2013.01); *F16K 47/08* (2013.01); *F16K 47/12* (2013.01); *F16K 31/0634* (2013.01)

(58) Field of Classification Search
CPC ........ F16K 1/38; F16K 31/0634; F16K 47/12

USPC .......................... 137/596.17, 625.27; 251/126
See application file for complete search history.

(56) References Cited

U.S. PATENT DOCUMENTS

| | | | | |
|---|---|---|---|---|
| 3,987,814 | A | * | 10/1976 | Hall .............................. 137/469 |
| 4,444,220 | A | * | 4/1984 | Seger ............................ 137/312 |
| 6,470,909 | B2 | * | 10/2002 | Osterlanger et al. ....... 137/514.3 |
| 7,497,232 | B2 | | 3/2009 | Muller et al. |

(Continued)

FOREIGN PATENT DOCUMENTS

| | | |
|---|---|---|
| DE | 10 2004 020 268 A1 | 11/2005 |
| WO | 2005/026858 A1 | 3/2005 |
| WO | 2009/092488 A1 | 7/2009 |

OTHER PUBLICATIONS

German Search Report Corresponding to 10 2012 213 112.4 mailed Mar. 22, 2013.

*Primary Examiner* — John Fox
(74) *Attorney, Agent, or Firm* — Davis & Bujold, P.L.L.C.; Michael J. Bujold (57) ABSTRACT

A valve device having at least one inflow area and first and second outflow areas, which are connected with one another with regard to the flow through two poppet valves. Through the first poppet valve, a fluid inflow from the inflow area to the first and second outflow areas can be adjusted and a fluid outflow, through the second poppet valve between the first and the second outflow areas can be adjusted. The second poppet valve is designed as a cone poppet valve with a cone shaped closure body. Located upstream of the second poppet valve, between the first and the second outflow area, is a flow guide device which is designed to provide the fluid, which flows in the direction of the second poppet valve, with a swirl. The closure body of the second poppet valve has a cone angle of 60°+/−10°.

10 Claims, 4 Drawing Sheets

(56) References Cited

U.S. PATENT DOCUMENTS

| | | |
|---|---|---|
| 7,516,756 B2 | 4/2009 | Mayr et al. |
| 8,511,091 B2 * | 8/2013 | Goodwin .................. 60/772 |
| 2010/0276022 A1 | 11/2010 | Moosmann et al. |

* cited by examiner

VALVE DEVICE WITH A FLOW GUIDING DEVICE

This application claims priority from German patent application serial no. 10 2012 213 112.4 filed Jul. 26, 2012.

FIELD OF THE INVENTION

The invention concerns a valve device for a fluid in particular a pressure or control valve device.

BACKGROUND OF THE INVENTION

In a multistage, motor vehicle automatic transmission, known in the practice, shift elements which are designed as wet clutches or brakes to engage different gear ratio steps are placed between a transmission input shaft and a transmission output shaft of the automatic transmission. Hereby, engagement or disengagement of the shift elements is executed in accordance with the desired gear ratio step. The hereby needed pressure is often generated for each shift element by a hydraulically operated clutch piston which is supplied with hydraulic fluid through shift element valves, also called pressure reducing valves. These pressure reducing valves are either designed in themselves as proportional pressure control valves or are activated through a hydraulic pre-control, whereby the pressure which is required for the pre-control is again adjusted through a proportional pressure control valve. In such a proportional pressure control valve, a magnetic force is created depending on the current and this dependence adjusts a certain foreseeable working pressure at the valve. This pressure is available at an outflow area and is created through the ratio between the magnetic force (action force) and, acting opposite to the magnetic force, a reverse force of the valve (reaction force).

Today's common proportional pressure control valves, for instance the one which is taught in WO 2005/026858 A1 as two poppet vales, coupled in a hydraulic half wave bridge configuration, meaning they have an inflow area and two outflow areas, whereby a first poppet valve, with regard to the flow, is positioned between the inflow area and the first outflow area, and a second poppet valve is positioned between the first outflow area and the second outflow area. Hereby, the poppet valves are designed in a way and their lock bodies are coupled with each other so that the lock bodies in the end position alternately engage or disengage the poppet valves, respectively.

For the reduction of the flow resistance and an increase of a dynamic control performance of a transmission element, which is triggered by a pressure control valve, the WO 2005/026858 proposes a flow guide device, in detail a flow deflector, arranged between the first and the second outflow area which diverts the fluid flow from the first poppet valve to the second poppet valve by less than 30°.

It is also known through WO 2009/092488 A1 that such a flow deflector device needs to have several duct areas, so that the fluid flowing in the direction of the second poppet valve obtains a swirl, which causes the valve dynamic to increase and a valve leakage to decrease.

These pressure control valves which are known as state of the art can produce pressure fluctuations at the inflow or outflow side, for instance through pump pressure or slip-stick effects in the shift elements of a motor vehicle transmission, and have a nearly unrestricted effect at the lock bodies of the poppet valves, whereby an adjustment of the available operation pressure at the valve becomes more difficult.

SUMMARY OF THE INVENTION

It is therefore the task of the invention to provide a valve device which is insensitive to pressure fluctuations.

Thus, a valve device, in particular a pressure control valve device, is propose for a fluid with at least an inflow area and a first and a second outflow area which can be linked together in regard to the flow through two poppet valves which are coupled with each other, whereby a fluid inflow can be adjusted through the first poppet valve from the inflow area to the first and the second outflow area, and that a fluid outflow can be adjusted through the second poppet valve between the first and the second outflow area and the second poppet valve is designed as a cone poppet valve with a cone shaped closure body. Hereby, a flow guide device is positioned upstream between the first and the second outflow area of the second poppet valve, which is designed in a way that it provides the fluid, which flows in the direction of the second poppet valve, with a swirl. This swirl can be in particular a swirl around a longitudinal axis or the moving axis of the closure body of the second poppet valve. It is provided that the closure body of the second poppet valve has a cone angle of 60°+/−10°.

Within the framework of the invention, it was noticed that the art and shape of the second poppet valve has a surprisingly large influence to the sensitivity of the valve device with regard to pressure fluctuations. Other influencing factors, such as length and diameter of the flow guide device, entry angle of the fluid flow into the flow guide device, service characteristics of the flow guide device (roughness, material/coating) etc., as well as viscosity, density, surface tension, adhesion trend of the fluid which flows through, also play a role in regard to the pressure fluctuation sensitivity, but have a lower importance in regard to art and shape of the second poppet valve.

It has been noticed through closer consideration that a valve device with the inventive design of the second poppet valve and its closure body, meaning as a cone poppet valve with a cone angle of approximately 60° (angle measure), as an extraordinary good flow characteristic in regard to the pressure fluctuation sensitivity. At the same time, such a valve device demonstrates a very low leakage, meaning the amount of fluid which flows through the second valve device is very low. Even better results can be achieved with a cone angle of 60°+/−5°. The cone angle is meant to be the angle of the cone shaped closure body in the area of the valve location of the second poppet valve, meaning in particular in the area of a surface support of the closure body at the corresponding valve position of the second poppet valve when it is engaged.

The valve socket has preferably a supporting surface which corresponds with the closure body in which the cone shaped closure body attaches to when the poppet valve is engaged. It means that the valve socket of the second poppet valve has a corresponding cone shaped sealing surface (=support surface) with the closure body, which has the same cone angle as the closure body. Hereby, an improved valve dynamic can be achieved because a negative pressure is created in the gap between the valve positioning and the closure body when the fluid flows through, which creates an acting force at the closure body in the direction of the valve socket (=engaging direction).

The coupling of the two poppet valves in regard to the flow connection of the inflow area and the two outflow areas is in particular design so that they engage or disengage in an opposite way. It corresponds to the previously mentioned hydraulic half bridge configuration. The activation of the poppet valves can be executed, for instance, through a pushrod which activates simultaneously both poppet valves.

In a further embodiment, the flow guide device has a first area. It has several, separated from each other, duct areas which are designed in a way so that they provide a swirl to the fluid which flows in the direction of the second poppet valve. Also, the flow guide device has a second area which has an inner space. This inner space narrows downstream and is mainly rotationally symmetric and also designed in a way that the fluid, which was provided by the first area with the swirl, is brought to the second poppet valve.

In a first embodiment hereof, the ratio between a diameter of the inner space in exit openings of the duct areas (into the inner space) and a minimal diameter of the inner space at the second poppet valve is 1.5+/−0.1. This means that the inner space, starting with the diameter at the exit openings of the duct areas (the fluid flows freely and with a swirl from here to the second poppet valve), reduces by approximately 33% to the smallest position of the inner space. Hereby, the swirl velocity of the swirl in the fluid flow gets larger with an increasing proximity to the second poppet valve (through the lowering of the moment of inertia of the fluid flow, mainly by keeping the present kinetic energy of the flow), so that the fluid flow in the area of the second poppet valve, due to a centrifugal force and just by itself, assumes a thin film cone or bell shape, respectively. Hereby, the fluid flows as thin film around the closure body of the second poppet valve or, especially favorable to the flow, tangentially against this closure body. The transfer of pressure fluctuations in the fluid flow acting at the closure body is hereby practically eliminated.

In a second embodiment, which can be an alternative or in additional to the above mentioned first embodiment of the valve device, a narrowing angle of the inner space at a downstream positioned end location of the narrowing inner space is 45°+/−10° (angle measure). The narrowing angle needs in particular to be understood as the angle of the wall of the inner space which causes the narrowing of the inner space downstream, meaning a (negative) inclining angle of this wall. In particular, the inner space is designed as being concave, with a continuously increasing narrowing downstream. Thus, the fluid flow is advantageously, continuously guided downstream along the wall of the inner space. Through the narrowing angle of approximately 45°, and with an disengaged second poppet valve, a special flow is created, meaning mainly a seamless change of the fluid flow from the flow guide device to the closure body of the second poppet valve, and the tangential, thin-film touch of the fluid flow at the closure body is supported. Thus, the fluid flow attaches itself in the area of the second poppet valve, without any diversion, to the closure body of the second poppet valve and the transfer of pressure fluctuations in the fluid to parts of the valve device is avoided to a large extent. Even better results can be achieved through a narrowing angle of 45°+/−5°.

In a third embodiment, which can be an alternative or in addition to the above mentioned first and/or second embodiments of the valve device, the ratio between and axial length of the narrowing inner space and a minimal diameter at the inner space at the second poppet valve is 0.6 to 0.8. The axial length of the narrowing extends in particular from the exit openings of the duct areas of the flow guide device (into the inner space) up to the area of the inner space in which it has the smallest diameter. It has been seen that hereby, improved damping of pressure fluctuations in the fluid flow can be accomplished, by maintaining a low leakage.

In a fourth embodiment, which can be an alternative or in addition to the above mentioned first and/or second and/or third embodiment, the first and second area of the flow guide device are each designed as one part. At least one of these parts is in particular a cone shaped, i.e. truncated cone shaped area which is designed in a way that it aligns the predefined part of a first area to the part of the second area at least in a radial axis of the flow guide device. This radial axis can be assumed and in particular as an axis which runs perpendicular to the rotation symmetrical access of the inner space of the flow guide device. In particular, the part of the first area has a radial play and is fixed and aligned in the radial direction only at contact of the first part to a provided surface for this purpose. Hereby, an automatic alignment of the two parts to each other is achieved during the installation of the valve device. Since the alignment of these parts is essential to the quality and efficiency of the created swirl flow, it is advantageous that as few parts as possible can possibly influence the alignment—this is guaranteed through such a design of the flow guide device. In particular, both parts have cone shaped/truncated cone shaped surfaces which correspond with each other in regard to the relative position of the parts.

The above explained first, second, third, and fourth designs are either applied individually, or as pair, or as triple, or altogether in the valve device. In particular, the swirl/fluid flow which is created by means of the first, second, and/or third design of the flow guide device corresponds especially well with the 60° cone angle closure body of the second poppet valve, the transfer of pressure fluctuations through the fluid flow at the closure body is hereby especially low, and a good damping of pressure fluctuations in the fluid flow is achieved.

Basically, the first, second, third, and/or fourth design of the flow guide device can be used as well in a valve device in which the cone angle of the closure body of the second poppet valve is not equal to 60°+/−10°, or which the closure body has a ball shaped design (second poppet valve=ball poppet valve). However, in this case each of the described, advantageous effects (i.e. lower impact of pressure fluctuations, better damping of the pressure fluctuations) are lower.

Thus, the invention can also relate to a valve device, in particular a pressure control valve device, with at least an inflow area and a first and second outflow area which can be connected, with regard to the flow, through two poppet valves which are coupled with each other, whereby through the first poppet valves a fluid intake can be adjusted from the intake area of the first and second outflow area, and through the second poppet valve a fluid outflow can be adjusted between the first and the second outflow area, and that the second poppet valve is in particular designed as a cone poppet valve with a cone shaped closure body, and whereby upstream, where the second poppet valve is positioned, a flow guide device is positioned between the first and the second outflow areas which is designed in a way so that it provides the fluid flow which runs in the direction of the second poppet valve with a swirl, whereby the flow guide device as a first area with several, separated from each other, duct areas which are designed in a way that they provide the fluid which runs in the direction of the second poppet valve with a swirl, and whereby the flow guide device as a second area with an inner space, narrowing downstream and which is mainly rotationally symmetrical, which is designed in a way that the fluid, which has been provided with the swirl by the first area, is brought to the second poppet valve, and whereby:

A ratio between a diameter of the inner space at exit openings of the duct areas and a minimal diameter of the inner space at a second poppet valve is 1.5+/−0.1, and/or A narrowing angle of the narrowing inner space at the upstream positioned end of the inner space is 45°+/−10°, and/or A ratio between an axial length of the narrowing inner space and the minimal diameter of the inner space at the second poppet valve is 0.6 to 0.8, and/or The first and second areas each have a part and at least one of these parts has mainly a cone shaped surface which is designed in such a way that the part of the first area aligns with the predefined part of the second area in at least a radial axis of the flow guide device.

In another embodiment of the valve device, the first poppet valve is designed as a valve orifice with a valve opening and a valve control edge, as well and is with the valve control edge which interacts with the ball shaped closure body. Hereby, the ratio of the diameter of the valve opening compared to the diameter of the ball shaped closure body is at least equal to 0.75 or larger. Thus, the valve opening is designed as a circular opening. The term circular and ball shaped are hereby to be understood that the opening or closure body, respectively, are mainly of a circular or ball shaped design. This is for instance the case when there roundness in this part of typical manufacturing tolerances.

Especially in a low load area of a load shift automatic transmission, may be when rolling and down shifting, the system imminent inflow pressure dependence of the pressure control valves can be, as described previously, considered as especially disruptive. This applies especially when in this load condition the inflow pressure fluctuations, especially inflow pressure dips, occur and therefore nominal pressure deviations are generated which, through clutch valve transmissions amplified, create a non-acceptable shift behavior. To optimize the behavior of the pressure valves, especially at low control pressures and large inflow pressure dips, so that then only minimal nominal pressure fluctuations occur and the shift quality remains hereby not affected, it was recognized that at a given inflow aperture geometry, namely the diameter and the form factor, in particular the size of the lock element, due to surround flow forces, is not free of feedback. Therefore, there is an influence on the patrol pressure which is to a certain extent dependent on the geometry of the lock elements.

It was recognized that the described influence on the control pressure can be minimized if, in accordance with the invention, the ratio of the diameter of the valve opening compared to the ball diameter of the closure body is at least 0.75 or larger. Naturally, this ratio needs to remain, also considering the tolerances, small than 1 for the ball diameter and the valve opening diameter, so that the closure body can safely set on the valve control edge if a complete lock of the pressure control valve device is adjusted, without penetrating into the valve opening.

Especially preferred, in the engaged condition of the first poppet valve, is a ratio of a dipping depth of the ball shaped closure body into the valve opening, compared to the diameter of the ball shaped, creates the value of 0.2 or larger. Therefore, it results in a ratio of the diameter of the valve opening compared to the ball diameter of 0.8 or more. This can be realized favorably during the manufacturing and solves optimally the previously mentioned task, meaning to provide and especially improved non-sensitivity against pressure fluctuations. Especially preferable is the diameter ratio of 0.8 for these reasons.

In another embodiment of the valve device, an additional, second flow guide device is positioned gear upstream of the first poppet valve in the inflow area, which overlays the inflowing fluid in the area of the first poppet valve with the predetermined flow characteristic.

It has been shown that such a positioned flow guide device and its designed pressure control valve device, upstream from the first poppet valve in the inflow area, is less sensitive than the named known pressure control valve devices, as in the state-of-the-art, against pressure fluctuations from the inflow area, meaning of an inflow side in of the first outflow area, meaning in an operating connection.

Also the valves which are known in the state-of-the-art, and their inflowing fluid into the first poppet valve have a flow characteristic which is unpredictable and dependent on a multitude of parameters, in particular the fluid pressure, the fluid flow velocity, and the design of the fluid system (pipe diameter, pipe pattern) which is positioned upstream of the pressure control valve device, which causes that the flow characteristic of the fluid which inflows into the valve is exposed to large fluctuations. It can hereby happen that identically constructed pressure control valve devices, under same operating conditions (pressure level, fluid temperature, etc.), installed in different fluid systems, have different control characteristics. For instance, a pressure control valve device in a shift device of an automatic transmission can have a different control characteristic than an equally constructed pressure control valve device in a shift device of an automated shift transmission, which is due to the different designs of the fluid systems which are present upstream of the pressure control valve device.

Through the proposed procedures, the fluid stream is now branded with a predetermined fluid characteristic, in particular a flow direction and/or flow velocity (flow field). That means that the previously, not foreseeable, characteristic of the fluid which flows into the valve device is now brought into known, stabilized tracks. In particular, pressure fluctuations are hereby smoothed out and guided in a way that they have no or marginal effect on the valve device.

Through the propagation of the stabilized flow which happened in the second flow guide device, also upstream of the first poppet valve, vibrations or disturbances, in particular pressure fluctuations which get from the first outflow area of the valve device, meaning the operational pressure connection, are smoothed out, whereby they in a preferred art do not or limited continue upstream into the pressure control valve device.

The second flow guide device comprises preferably of at least one or several guide vanes, flow guide ducts, or of the flow guide parts in the inflow area. The second flow guide device is hereby in particular designed in a way that the inflow fluid which comes from the inflow area is mainly guided around the closure body. Pressure fluctuations in the fluid stream are now no longer hitting the closure body perpendicular, which causes that it gets less stimulated and the control quality of the valve device is being improved.

It is provided in an especially preferred embodiment of the pressure control valve device, to design the second flow guide device as in a way so that a swirl is added to the inflowing fluid in the area of the first poppet valve, in particular the a swirl flow around a longitudinal axis or moving axis of the closure body of the first poppet valve. Thus, the flow characteristic which is predetermined by the second flow guide device matches the swirl flow. Hereby, stimulations/disturbances which get from the inflow area or the first outflow area into the valve device are especially well damped. Such a swirl flow is especially stable and absorbs in a damping way the stimulations/disturbances. The longitudinal or moving axis of the closure body is hereby understood as an axis along which the closure body of the particular poppet valve can be moved for the disengagement or engagement of the poppet valve.

Through the specific guidance of the flow in the direction of the first poppet valve by means of the second flow guide device, in particular in form of a swirl flow, also the flow resistance of the first poppet valve is reduced which is mainly due to a reduction of the turbulence flow components in the inflowing load, which causes a lesser (pressure-) oscillation stimulation.

It is provided in an especially preferred embodiment of the valve device that both of the flow guide devices of the valve device are designed that way that the swirl of the fluid flow through the first poppet valve and the swirl of the fluid flow through the second poppet valve and the same rotation direction. As it was seen, the effects of an increased valve dynamic and a reduced valve leakage are amplified, if both flow guide device as are designed that way that the rotation direction of the fluid flow through the first poppet valve matches the rotation direction of the fluid flow through the second poppet valve. Both flow guide devices can be designed in an analogous mechanical construction.

In a further embodiment of the valve device, the second flow guide device has at least one, preferably several flow guide ducts, which at least run approximately tangentially to a poppet valves opening of the first poppet valve into the inflow area. The fluid flow is hereby frictionless mainly tangential brought around the closure body of the first poppet valve. The characteristic in form of a thin film along the closure body of the flowing fluid through the first poppet valve is hereby supported. Preferably, the flow guide ducts run hereby downstream in the direction of the poppet valve opening together in a funnel shape, in particular in the way that the fluid with increasing proximity to the poppet valve opening is accelerated (maintaining of rotation pulse). If there is just one flow guide duct provided, then it runs downstream in a funnel shape towards the poppet valve opening. Preferably, the funnel shape has, in regard to a longitudinal or moving axis of the closure body of the first poppet valve an opening angle of 40° to 80°, specially preferred is 60°±10°. The funnel shape in hereby also be rounded, in particular convex or concave. In this case the opening angle corresponds in particular to an average inclining angle of the funnel shape or inclining angle of the funnel shape at the downstream positioned end. The flow guide duct or ducts, respectively, can also be designed in form of a helix. Preferably, the helix runs hereby concentric or eccentric around the longitudinal or moving axis of the closure body. Instead or in addition to the helix shape, the flow guide duct or ducts, respectively, can run in a spiral shape the words the poppet valve opening, meaning they run downstream in a decreasing radius towards the poppet valve opening.

In a further embodiment of the valve device, the width or a diameter of the flow guide duct or ducts, respectively, decreases, meaning its flow cross-section, and with an increasing proximity to a longitudinal or moving axis of the closure body of the first poppet valve. In particular, a fluid input opening or a fluid input cross-section, respectively, through which a fluid into the respective flow guide duct flows, as a larger throughput area compared to a fluid outflow opening or a fluid output area, respectively, through which fluid outflow from the respective flow guide duct and which is, compared to the inflow opening or inflow cross-section, closer to the longitudinal or moving axis. Hereby, the velocity of the fluid in the flow guide ducts is increased with an increasing proximity to the longitudinal or moving axis, respectively, and therefore in the direction of the valve opening of the first poppet valve, which achieves a fast the and more stable fluid flow downstream of the flow guide ducts in the area and downstream of the first poppet valve.

In an embodiment of the pressure control valve device, a cross section of the flow guide ducts is in a plane, perpendicular to a longitudinal or moving axis, respectively, of the first poppet valve, and is a propeller shape or at least mainly propeller shape. In other words, the flow guide ducts form in each case propeller blade recesses or ducts, whereby the basis each propeller blade as a piece opening for the fluid exit in the direction of the first poppet valve. This opening can extend itself over the complete axial length of each flow guide duct, or just be present in the area of the valve opening of the first poppet valve. To create a swirl flow, the outflow opening of each flow guide duct has preferably, in relationship to the longitudinal or moving axis, an offset to the side, meaning it passes mainly tangentially by the longitudinal or moving axis. In particular, the outflow opening is therefore designed in a way that the fluid exits the flow guide ducts tangentially or at least nearly tangentially in regard to the valve opening of the first poppet valve. The propeller shape of the flow guide ducts relates to or is similar preferably to the propeller shape of a sea or air plane propeller, for instance a boat, ship, or air propeller. The shape of the propeller blade can also mainly correspond or be similar to the shape of a cloverleaf (for instance *Quadrifolium pratense*).

An especially preferred variation of the valve device has a proportional electro-magnet, meaning an electro-magnet with a solenoid where its position can be changed depending on the provided current. The solenoid serves hereby for the movement of two lock bodies, coupled with each other, of the first and of the second poppet valve. Hereby, the present/available pressure at the first outflow area can be exactly adjusted or controlled, respectively, based on the provided electric current. The proposed valve device is also preferably designed as a hydraulic pressure control valve, in particular as hydraulic pressure control valve device for a motor vehicle transmission. The area of application of the valve device is in particular in a design of a hydraulic gear shift device to select different gear ratios of a multi-gear automatic transmission or automated transmission in a motor vehicle, without being limited to it. Thus, also applications outside of the automotive area are possible, for instance stationary hydraulic systems or mobile work tools.

BRIEF DESCRIPTION OF THE DRAWINGS

In the following, the invention is further explained based on examples and drawings through which additional advantageous embodiments and characteristics of the invention can be seen. It shows, each in a schematic presentation, FIG. 1 a two-dimensional section through a valve device along a longitudinal axis.

DETAILED DESCRIPTION OF THE PREFERRED EMBODIMENTS

Figure 1:
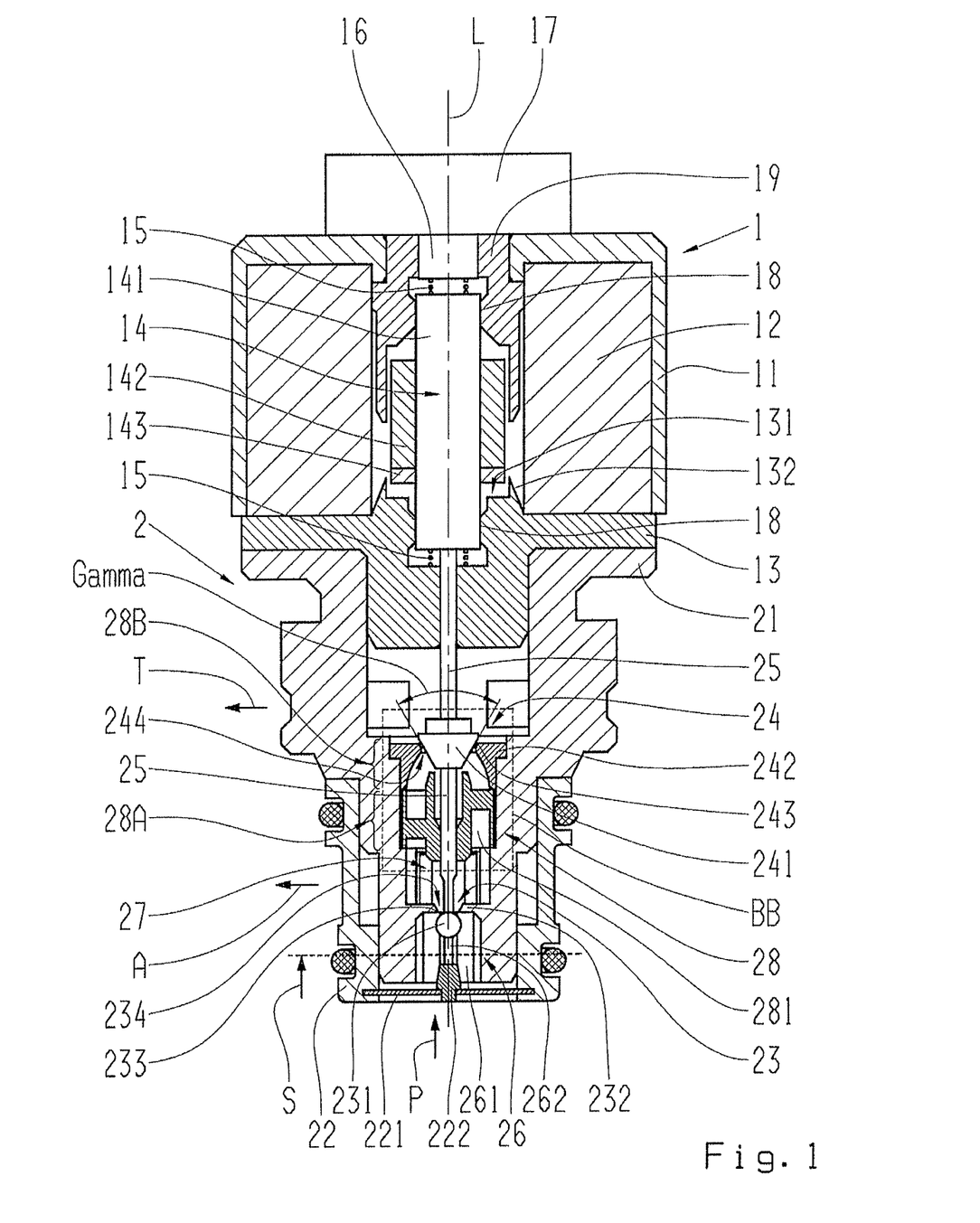
Figure 1A:
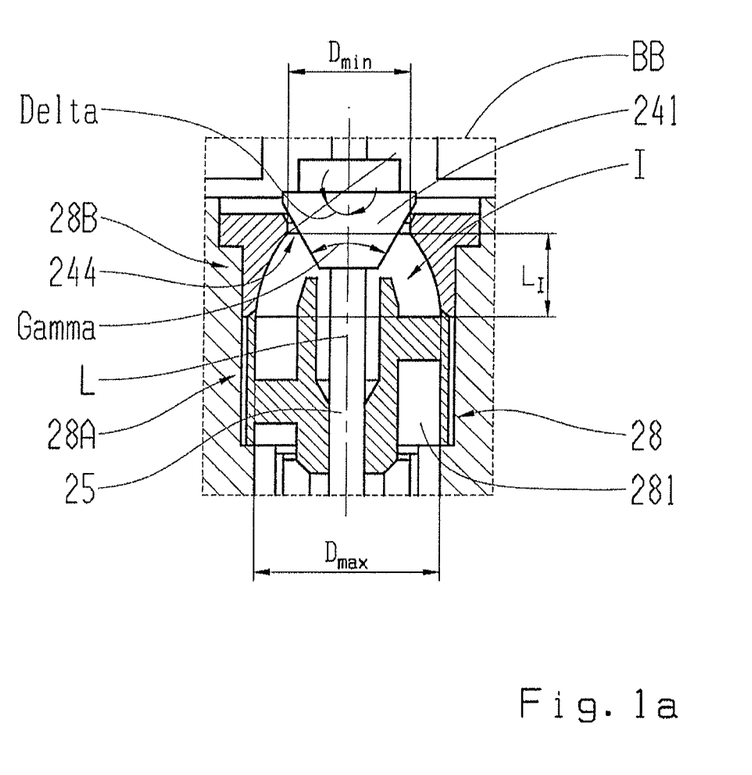
FIG. 1*a* an enlarged view of a portion from FIG. 1.
Figure 2:
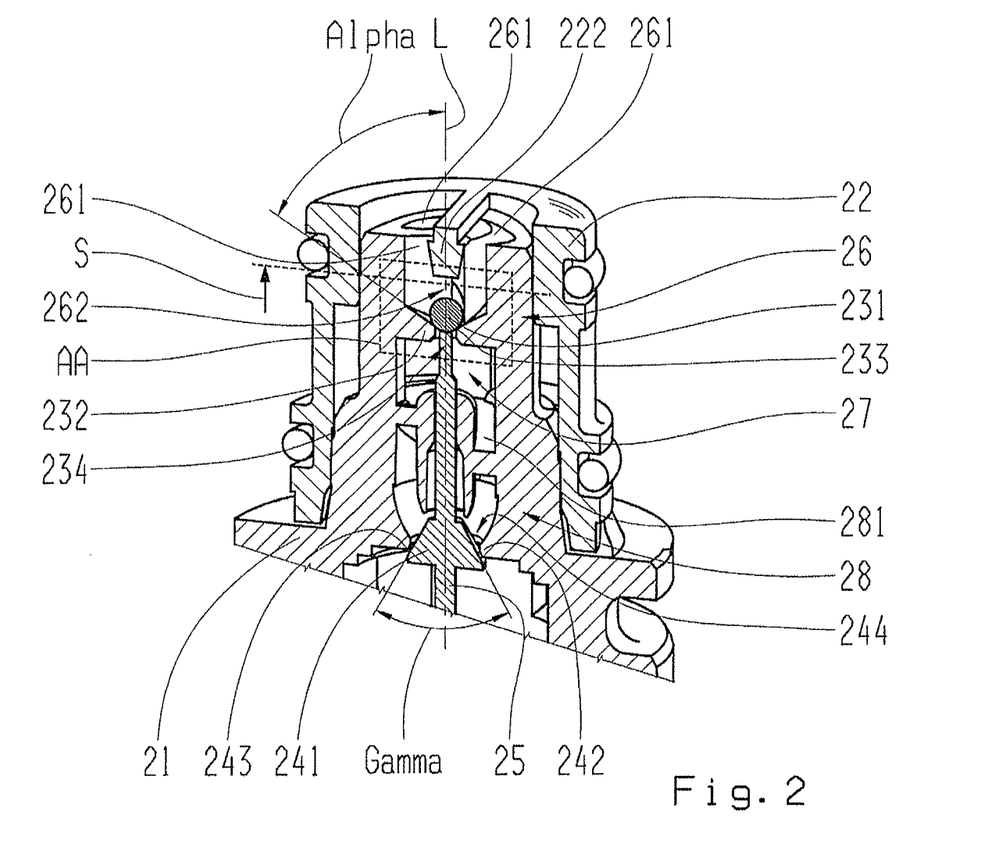
FIG. 2 an isometric section through a valve part of a valve device in accordance with FIG. 1 along the longitudinal axis.

The same reference characters are used in FIG. 1 to FIG. 3 for the same or at least functionally the same parts.

FIG. 1 shows a longitudinal section through a valve device, designed as a proportional pressure control valve. The valve device comprises mainly of an electro-magnet part 1, meaning an actuator, and a valve part 2, which are firmly linked together by their housings 11, 21. The electro-magnet part 1 has an electromagnet comprising at least an electric magnetic coil 12 which is positioned in the housing 11, the magnetic coil 12 fixed to a magnetic yoke 13, and a solenoid which is movable with respect to the magnetic coil 12 and the magnetic yoke 13. The armature 14 is illustrated in three parts in this case and comprises an armature rod 141, an armature body 142, as well as an anti-stick washer made from nonmagnetic material, for instance aluminum. Other suitable armature constructions/models are applicable. The optional anti-stick washer avoids magnetic sticking of the armature 14 when the magnetic coil 12 changes from a current flow condition to a non-current flow condition.

The position of the armature 14 under a no-current condition of the magnetic coil 12 is predetermined by means of two elastic spring elements 15, hereby for example as pressure screw springs, within the electro-magnet part. The spring element 15 (in FIG. 1 at the top) which is opposite from the valve part 2, can receive an adjustable preload through a preload element 16. It can be, like in the present case, a press-fit whereby the preload is adjusted or screwed in depending on the pressed-in depth. Attached to the housing 11 of the electro-magnet 1 is an electric contact device 17 which is electrically connected with the magnetic coil 12 and through which the magnetic coil 12 can be supplied with current.

The magnetic yoke 13 has at the head-end facing the armature 14, a dipping step 131 with a magnetic control edge 132, here in the form of a cone, and which can be exactly adjusted to how large the acting magnet force at the armature 14 should be, at each electric (nominal-) current and at each (nominal-) position of the armature 14. Preferably, the magnet control edge 132 is designed in a way that the present magnetic force is proportional to the amount of current which is applied at the coil 12, to a large extent independent of where the armature 14 is presently positioned in regard to the magnetic yoke 13 (proportional electromagnet).

Attached to the electro-magnet part 1, the valve device has a valve part 2. It has an optional filter cage 22 which is attached to the housing 21. Positioned at the filter cage 22 are gaskets which seal an inflow area P, a first outflow area A, and a second outflow area T of the valve device from each other in a fluid tight manner. The inflow area P, also called pressure supply connection, is positioned at an axial head-end of the valve device, while the first outflow area A, also called operating pressure connection, and the second outflow area T, also called tank port area, are positioned radial to the longitudinal axis L. through a respective, suitable duct positioning within the valve part 2, the positioning of the inflow area P and the first and second outflow area A, T can also be swapped against each other. A preferred flow direction of the fluid from or into, respectively, the inflow area P and at the first and second outflow areas A, T is shown in FIG. 1 with arrows.

The valve part 2 has, inside of the housing 21, a first poppet valve 23 and a second poppet valve 24, through which the inflow area P, the first outflow area A, and the second outflow area T can be connected with each other in regard to the flow. Hereby, a pressure level can be specifically adjusted in the first outflow area A.

The first poppet valve 23 has, along a longitudinal axis of the first poppet valve 23, a movable closure body 231, which in the present case is in the form of a ball, and the second poppet valve 24 has also, along a longitudinal axis of the second poppet valve 24, a movable closure body 241. This one has a cone shape. The second poppet valve 24 is accordingly designed as cone poppet valve. The longitudinal axes or moving axes of the poppet valves 23, 24 match and result in the longitudinal axis L of the pressure control valve device.

Through the application of suitable diversion tools, the longitudinal and moving axes of both poppet valves 23, 24 can also be different to each other and for instance parallel or skewed with respect to each other. The corresponding counterpart of the closure body 231 is, with regard to the closure body 231, a stationary valve orifice 232. It has a control edge 233 (valve seat) to which the closure body 231 in the illustrated, engaged condition is attached, which causes the first poppet valve 23, specifically a valve opening 234 of the first poppet valve 23, to be sealed at least substantially fluid-tight. A first, effective valve opening surface, which is created between the closure body 231 and the control edge 233 through the disengagement of the first poppet valve 23, determines hereby be amount of the fluid which flows towards the first poppet valve 23 and the pressure drop at the first poppet valve 23 which causes an influence at the pressure that is present or available, respectively, at the first outflow area A. the corresponding cone to parts of the closure body 241 of the second poppet valve 24 is also a valve orifice 242, however, this has a cone shaped control surface 243 (valve seat) instead of the control edge. The closure body 241 is attached to the control surface 243 when the second poppet valve 24 is engaged, which causes that the second poppet valve 24, specifically a valve opening 244 of the second poppet valve 24 to be sealed as least substantially fluid-tight. A second effective valve opening surface, which is created between the closure body 241 and the control surface 243 during the disengagement of the second poppet valve 24, determines the fluid outflow amount which runs through the second poppet valve 24 and its dropping fluid pressure, through which also the present or rather available pressure at the first outflow area A is impacted.

Since the fluid which is in general flowing through the second poppet valve 24 is brought directly into the fluid reservoir, the fluid amount which flows through the second poppet valve 24 is often also called leakage. In the illustrated configuration of the pressure control valve device, the closure body 231 of the first poppet valve 23 is positioned upstream of the valve opening 234, and the closure body 241 of the second poppet valves 24 is downstream of the valve opening 244. To achieve the lowest possible sensitivity with regard to pressure fluctuations, the closure body 241 of the second poppet valve 24, meaning its cone shape, has a cone angle (angle GAMMA) of 60°+/−10°, in particular in however +/−5°, to achieve a good or especially good, respectively, pressure insensitivity. The cone shaped control surface 243 has therefore the same cone angle.

The person skilled in the art would appreciate that the first poppet valve 23, specifically its closure body 231 and the corresponding valve orifice 232, can also be designed in a different manner. For instance, it could be designed as a cone poppet valve with a cone shaped closure body 231, analogous to the presented second poppet valve 24. Also the first poppet valve 23 could be designed as a flat poppet valve. In the illustrated case, the first poppet valve 23 has a control edge 233, which the closure body 231 abuts in the engaged condition, meaning that it is mainly a line contact between the closure body 231 and the valve orifice 232, while the second poppet valve 24 has a control surface 243 which the closure body 241 abuts in the engaged condition, meaning there is specifically a surface contact between the closure body 241 and the valve orifice 242. It is clear that the poppet valves 23, 24 can also be designed in a way that both or one of the poppet valves 23, 24 have a surface contact or a line contact between the closure body 231, 241 and the valve orifice 232, 242. For the creation of a surface contact, the particular valve orifice has shaped surface that is complementary to the closure body, and for the representation of a line shaped contact, the valve orifice has a surface shape of the closure body which complements the control edge.

The closure bodies 231, 241 of the poppet valves 23, 24 are actuated by means of the pushrod 25 which runs movable along the longitudinal axis L. With it, at least the closure body 241 of the first poppet valve 24 is connected. This connection can be either stationary (as presented) or also be flexible through an inserted, elastic element, for instance through a spring configuration that is positioned between the closure body 241 and pushrod 25. The closure body 231 can also be either connected to the pushrod 25 or completely independent from the rod 25, whereby the pushrod 25 just pushes away the closure body 231 from the valve orifice 232 so as to disengage the first poppet valve 23, and hereby release the valve opening 234. Engagement of the first poppet valve 23 is effected at a loose closure body 231, in regard to the pushrod 25, exclusively by the pressure of the inflow in fluid from the inflow area P. The closure bodies 231, 241 are linked through the pushrod 25 in a way so that the poppet valves 23, 24 can be exclusively, alternatively actuated. This means, on one hand, that when the first poppet valve 23 is disengaged, the second poppet valve 24 can be engaged, and, on the other hand, when the first poppet valve 23 is engaged, the second poppet valve 24 can be disengaged. The configuration and coupling of the poppet valves 23, 24 relates therefore to a hydraulic half bridge configuration.

The pushrod 25 passes through the magnetic yoke 13 and is attached at the head-end of the armature 14 facing the valve part 2. It also can be linked with the armature 14 alternatively either firmly or through an elastic element, for instance in a spring configuration, etc. The opening, in which the pushrod 25 passes through the magnetic yoke 13 is preferably designed as fluid-tight, as a guide for the pushrod 25. A magnetic force induced, axial movement of the armature 14 in the direction of the valve part 2 is therefore transferred directly to the pushrod, whereby it is also moved and initiates disengagement of the first poppet valve 23 and engagement of the second poppet valve 24. A spring force which is present at the spring element 15 in the direction of the valve part 2 and a fluid pressure force which acts at the closure body 231 create, with an increasing deflection of the armature 14 and the pushrod 25, an increasing counterforce against the magnet force. Thus, the first poppet valve 23 disengages only so far and the second poppet valve 24 engages only so far, until the magnet force and the counterforce are in a force balance. Depending on the opening size of the poppet valves 23, 24 a certain fluid pressure is created in the first outflow area A which is below the present fluid pressure at the inflow area P, and which is above the present fluid pressure at the second outflow area T. The fluid pressure at the second outflow area T corresponds generally with an atmospheric pressure, since it is generally connected to a fluid reservoir which is at atmospheric pressure. Since the magnetic force, which is present at the armature 14, is dependent on the amount of the electric current which is supplied to the magnetic coil 12 (it happens in a proportional magnet mainly proportional to each other) and since the counterforce can be dependent on the deflection of the armature 14, a pressure level can be set or adjusted, respectively, at the second outflow area A, based on the electric current supplied.

It is hereby noted that the positions or shift positions, respectively, of the armature 14, the pushrod 25, and the poppet valves 23, 24, which are illustrated in FIG. 1, relate to an initial position of the valve device at which the magnetic coil 12 has no current flowing and therefore, no magnetic force is acting at the armature 14. Since the first poppet valve 23 is hereby fully engaged and the second poppet valve 24 fully disengaged, and therefore no fluid can flow through the valve device from the inflow side P (pressure is adjusted to "0" in the first outflow area), the presented valve device is a so-called normally-closed valve device with an increasing valve characteristic curve. This means that with an increasing amount of the supplied current, the first poppet valve 23 disengages and the second poppet valve 24 engages, such that the available pressure at the first outflow area A increases.

The illustrated valve device can also be modified in a way so that it becomes a normally-open valve device with a down sloping characteristic curve. Hereby, in the no-current initial state of the valve device, the first poppet valve 23 is fully disengaged and the second poppet valve 24 fully engaged, subsequently fluid from the inflow area P can exclusively flow to the first outflow area A and there is a maximal pressure present. With an increasing flow of current in the magnetic coil 12, the first poppet valve 23 gets engaged and the second poppet valve 24 gets disengaged, and the pressure which is present at the first outflow area P drops accordingly. Hereby, the first and the second poppet valves 23, 24 are modified in a way so that the closure body 231 is positioned downstream of the valve opening 234, and the closure body 241 is positioned upstream of the valve opening 244, while the magnetic yoke 13 with the dipping step 131 and the control edge 132 are positioned at the electromagnet part 1 which faces away from the valve part 2.

In accordance with FIG. 1, a second flow guide device 26 is positioned at the inflow side, meaning upstream of the first poppet valve 23 in the inflow area P, which imposes to the inflowing fluid in the area of the first poppet valve 23 a predetermined flow characteristic.

In the presented case, the flow guide device 26 comprises of several flow guide ducts 261, which are positioned in the form of recesses along the longitudinal axis L of the pressure control valve device in the housing 21 of the valve part 2. Along a cut plane S, which is positioned perpendicular to the longitudinal axis L, each of the flow guide ducts 261 has a cross section in form of a propeller blade (See FIGS. 2 and 3d). Thus, with an increasing proximity to the longitudinal axis L, the width decreases and therefore a through-flow area of each flow guide duct 261, which causes an acceleration of the fluid when it flows through the flow guide ducts 261 with an increasing proximity to the longitudinal axis L. This is amplified by the fact that the flow guide ducts 261 run downstream in the direction of the poppet valve opening together in the form of a funnel (see FIG. 2). The funnel shape is hereby formed through end areas of the flow guide ducts 261 which are positioned in an axial direction to the longitude axis L, and run slanted in reference to the longitudinal axis L.

Centered to the flow guide device 26, in this case for instance coaxial to the longitudinal axis L, a mainly circular opening 262 is positioned in the inflow area P, for instance a bore, inside which the closure body 231 of the first poppet valve 23 is movably positioned and into which the flow guide ducts 261 lead to. The opening 262 is closed upstream by a plug 222 which prevents the closure body 231 from falling out of the pressure control valve device. In the shown embodiment example, the plug 222 is part of a filter cage 22, but also can be designed as a self-sufficient component or part of the flow guide device 26 or the housing 21. It is not shown that the plug 222 is preferably designed with a good flow characteristic, in particular through a drop shaped or tapered cone shape design. Preferably, the plug 222 represents therefore a part of the flow guide device 26. This can be also achieved when the plug 222 is also flow guide ducts, guide blades, or similar. The plug 222 and the housing 21 can also be designed such that, the flow guide device 26 is created when these parts are combined, meaning that both parts 21, 222 have complementary portions of the flow guide device 26, which when the parts 21, 222 are joined create the actual flow guide device 26.

The flow guide ducts 261 lead at least approximately tangentially into the opening 262 or the valve opening 234, respectively, of the first poppet valve 23 in the inflow area P, meaning the outflow openings of the flow guide ducts lead, with an offset to the side of the longitudinal axis L, into the opening 262. Hereby, the fluid which flows into the opening 262 and valve opening 234 is swirled around the longitudinal axis L which results in a particularly favorable orientation and stabilization of the flow. In detail, the fluid which flows into the valve device, forms at the closure body 231, with a low flow resistance, a tangentially and thin film wise flow along the surface of the closure body 231. This not only transfers pressure fluctuations or other disturbances/stimulations in a very low way to the closure body 23, in addition, the swirling flow stabilizes the position of the closure body 23 on the rotational axis of the flow, meaning in the shown case at the longitudinal axis L. The closure body 23 is therefore also, when stimulated through outer forces, for instance through mechanical oscillations at the housing 11 and 21, kept stable in the swirl flow.

After flowing through the first poppet valve 23, the fluid gets into an intermediate space 27 where the fluid flow separates into a first partial flow going to the first outflow area A and a second partial flow going to the second poppet valve 24. The volume ratio and the fluid flow of the first and of the second partial flow is determined by the opening width of the second poppet valve 24, in detail through the effective valve opening surface of the second poppet valve 24. The first outflow area A has openings on the side in the housing 21 of the valve part 2 for the outflow of the first partial flow. In the same way, the second outflow area has openings on the side in the housing 21 for the outflow of the second partial flow.

In the intermediate space 27, upstream of the second poppet valve 23, a first flow guide device 28 is positioned, in regard to the flow, between the first and the second outflow areas A, T. It is designed in a way that the fluid which flows to the second outflow area T, meaning the second partial flow, is provided with a swirl in the area of the second poppet valve 24, around the longitudinal or moving axis of the first poppet valve 23, in this case the longitudinal axis L of the pressure control valve device. The first flow guide device 28 comprises a first area 28A mainly positioned upstream and a second area 28B positioned downstream. The first area 28A (swirl generator) has several flow guide ducts 281. These each have a helix shape and are concentric to the longitudinal axis L. Thus, the flowing fluid which runs in the direction of the second poppet valve 24 is provided with a swirl around the longitudinal axis L. The second area which simultaneously forms a part of the valve orifice 242 of the second poppet valve 24, has an inner space which narrows, starting at the exit openings of the flow guide ducts 281 and upstream to the valve opening 244 of the second poppet valves 24. This inner space is positioned mainly rotationally symmetrical around the longitudinal axis L or rather the moving axis of the closure body 241 of the second poppet valve 24. It guides the fluid which flows with a swirl through the flow guide device 28 to the second poppet valve 24. Through the narrowing of the inner space, the velocity of the swirling flow is increased upstream with an increasing proximity to the valve opening 244. After passing the second poppet valve 24, the fluid passes into the second outflow area T. Through the design of the valve device with the first flow guide device 28, a dynamic of the valve device can be increased, at a simultaneous reduction of the leakage. Preferably, but not mandatory, the two flow guide devices 26, 28 are designed in a way that each of the created swirl flows in the same rotational direction.

FIG. 1a shows the BB marked area of the valve device as in FIG. 1 in an enlarged view. As it can be seen in FIG. 1a, the first flow guide device 28 comprises of the two areas 28A and 28B, which are designed each as a component. The first component 28A, which has the flow guide ducts 281, has at the head-end facing the second component 28B a cone shaped surface. The second component 28B which has an upstream, narrowing inner space I to guide the swirling fluid flow toward the second poppet valve 24, as the head-end which faces the first component 28A, also a cone shaped surface. The cone shaped surfaces correspond with each other in a way that the second component 28B fixes, via the surfaces, a relative position between the first and the second components 28A, 28B in at least a radial direction. This radial direction runs perpendicular to the longitudinal or rather moving axis of the closure body 241 or the longitudinal axis L, respectively, of the valve device. Hereby the first component 28A has inside of the housing 21 a radial play and is, only at the installation of the second component 28B within the housing 21, relative to the second component 28B, brought into a defined radial position which takes place by means of the cone shaped surfaces of the components 28A, 28B. an attachment in the housing 21 in the area of the upstream positioned head-end of the component 28A serves hereby of the fixing of an axial position. It has the advantage that the components 28A, 28B definitely align to each other and that this alignment needs the lowest possible number of components (avoiding tolerance sequences). Because of the fact that the pushrod 25, with the closure body 241 on it, in the illustrated embodiment example in FIG. 1 and FIG. 1a, is radially guided in the first component 28A, while the second component 28B carries the valve orifice 242 and the valve guide surface 243 or valve seat, respectively, through the second poppet valve, the defined alignment of these two components 28A and 28B to each other causes simultaneously an exact definition of the relative position between the pushrod 25 or rather the fastened closure body 241 on it and the valve guide surface 243 (=valve seat).

The exit openings of the duct areas 281 of the flow guide device 28 into the inner space I, the inner space I has a diameter marked as $D_{max}$. In addition, the inner space I has a minimal diameter at the second poppet valve 24 which is marked as $D_{min}$. Preferably, the inner space is designed in a way, i.e. it narrows such that the diameter ratio $D_{max}/D_{min}$ is 1.4 to 1.6. Hereby, an accelerated fluid flow is created upstream which assumes, due to the centrifugal force and during the flow through the second poppet valve 24 a bell or rather cone shaped form with the closure body 241. Pressure fluctuations in the fluid have no or little effect at the closure body of 241, and therefore at the valve device. This design of the inner space I suits itself in particular with the closure body 241 which is designed at a cone angle of approximately 60°, but it is no definite prerequisite and can also be applied with a different formed closure body, for instance a round closure body, of the second poppet valve 24.

The narrowing inner space I has in addition in the area of its downstream positioned end, a narrowing angle which is marked as DELTA. The narrowing angle DELTA can be understood as the inclining angle of the inner space in reference to a longitudinal axis or rather rotationally symmetric axis of the inner space I, in this case the longitudinal axis L. Preferably, the inner space I is designed in a way such that the narrowing angle DELTA at the downstream positioned end of the inner space I is 45°+/−10°. Hereby the fluid stream is tangentially guided around the closure body 241, which also results in a reduction of the sensitivity for pressure fluctuations.

The narrowing inner space I has also an axial length $L_I$. This length $L_I$ extends from the exit openings of the duct areas 281 into the inner space I up to the particular area of the inner space I in which it has its most minimal diameter $D_{min}$ at the second poppet valve 24. Preferably, the ratio $L_I/D_{min}$ between the axial length $L_I$ and the minimal diameter $D_{min}$ of the inner space I at the second poppet valve is 0.6 to 0.8. Hereby, additional, improvement of damping the pressure fluctuations in the fluid stream is accomplished, and maintaining a low leakage.

The design of the inner space I through $D_{max}/D_{min}=1.4$ to 1.6 and DELTA=$45°+/-10°$ and $L_I/D_{min}=0.6$ to 0.8 creates, in conjunction with the cone angle of the closure body 241 GAMMA=$60°+/-10°$, an especially well non-sensitivity against pressure fluctuations, or damping of pressure fluctuations. The inner space can also be applied in a valve device where its closure body 241 could have a cone angle GAMMA which does not equal $60°+/-10°$ or where the closure body 241 would be designed in a ball shape (second poppet valve=ball poppet valve)–however with a reduced efficiency.

Basically, the first area 28A of the first flow guide device 28 which is shown in FIG. 1 and FIG. 1a can also have, for instance, guide blades or similar to create the swirl flow. The first area 28A can therefore also be designed, similarly to this described embodiment, for the second flow guide device 26.

For the actuation, i.e. linear movement, of the pushrod 25, another suitable actuator can be provided instead of the electro-magnet part 1, for instance an actuator which has an effect in the linear direction like a hydraulic, pneumatic, or of the electric (piezoelectric, pure electric, electro-motor based, etc.) actuator.

FIG. 2 shows an enlarged, isometric view of the valve part 2 of the valve device in FIG. 1. The electro-magnet part is not shown here. The components of the areas 23A, 23B of the flow guide device 28 are not individually presented for a clear overview. As can be seen from FIG. 2, the valve control edge 233 has an obtuse angle. Downstream of the valve control edge 233, the valve opening 234 has initially a cylindrical shape. It expands following this cylindrical shape, however kind of diffuse up to the intermediate space 27.

The flow guide ducts 261 of the second flow guide device 26 are in the embodiment which is shown in FIG. 2 designed as straight recesses in the housing 21 along the longitudinal direction L, whereby their cross-section on a section plane S is propeller shaped, perpendicular to the longitudinal direction L. Other cross section forms are also possible, if they are suitable. The flow guide ducts 261 can in particular, instead of being straight along the longitudinal axis L, have a helical shape around the longitudinal axis L, equal or similar to the flow guide ducts 281 of the flow guide device 28.

In the shown embodiment example, the flow guide ducts 261 run together in a funnel shape downstream in the direction of the valve opening. Hereby, the end areas, here especially end surfaces, of the flow guide ducts 261 are slanted in regard to the longitudinal axis L. The opening angle ALPHA of the funnel shape is in this present case approximately 60°, preferably the opening angle is however approximately $60°±10°$. Hereby, the funnel shape, meaning in this case the end areas of the flow guide ducts 261 can also be rounded and therefore be convex or concave. The opening angle then corresponds to an average inclining angle of the funnel shape, with regard to the longitudinal axis L or rather an inclining angle at a upstream positioned end of the flow guide ducts 261, i.e. in the area of the first poppet valve 23.

Figure 2A:
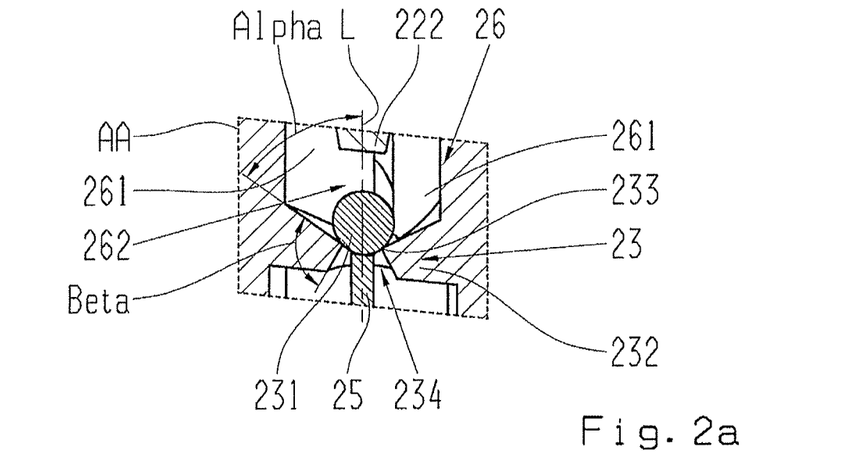
FIG. 2*a* an enlarged view of a portion from FIG. 2 with an alternative embodiment of a valve opening of the first poppet valve.

FIG. 2a shows an enlargement of the section AA from FIG. 2, however with an alternatively designed valve control edge 233 and valve opening 234. Compared to the design in accordance with FIGS. 1 and 2, the valve control edge 233 of the first poppet valve 23 is here designed as a rectangular (angle BETA), with no or a small, negligible chamfer, meaning the valve control edge 233 is designed as "sharp". Hereby, an advantageous, low flow resistance can be achieved at the flow of the fluid through the first poppet valve 23. The valve opening 234 of the first poppet valve 23 opens continuously downstream of the valve control edge 223 in a defuse way (cone shaped). Instead of being cone shaped, the valve opening 234, upstream of the valve control edge 233, can also be designed as convex or concave. Also the valve control edge 233 can be designed rectangular or in an acute angle.

A diameter ratio $D_V/D_K$ of the diameter $D_V$ of the valve opening 234 to the ball diameter $D_K$ of the closure body 231 of the first poppet valve 23 is hereby at least equal to the value 0.75 or larger, whereby the ratio $t/D_K$ of a dipping depth t of the ball 231, in the area of the valve control edge 233 in reference to the diameter $D_K$ of the closure body 231, is preferably equal to the value 0.2. The dipping depth t extends from the valve control edge 233, at which the closure body 231 is attached, when the first poppet valve 23 is engaged, to the end of the deepest, penetrated area of the closure body 231 into the valve opening 234.

FIGS. 3a to 3e show exemplary alternative embodiments of cross-sections of the flow guide ducts 261 from FIGS. 1 and 2 along the section plane S.

Figure 3A:
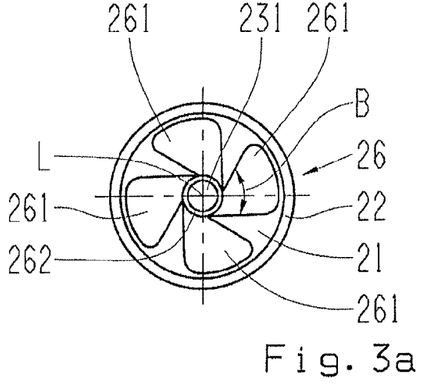
FIG. 3*a*-3*e* sectional views of alternative flow guide devices along a second section which runs perpendicular to the longitudinal axis of the valve device.

In accordance with FIG. 3a, the first flow guide device 26 has four propeller or cloverleaf shaped flow guide ducts 261. A width or a flow cross-section B, respectively, of the flow guide ducts 261 reduces with the increasing proximity to a longitudinal axis L of the pressure control valve device, in particular a longitudinal or moving axis of the first poppet valve. The flow guide ducts 261 lead each with an exit opening into the common, coaxial opening 262 which runs along the longitudinal axis L, in which the closure body 231 of the first poppet valve is movably positioned. To achieve a swirl flow, in the present case a flow with a clockwise rotation, the exit openings have an offset to the side with reference to the longitudinal axis L in a way that they tangentially pass by longitudinal axis L. The fluid, which exits the flow guide ducts 261, flows therefore tangentially or at least close to tangentially, with reference to the valve opening of the first poppet valve, into the opening 262, preferably in a form of a thin film along the closure body 231. In other words, at each of the bases of the respective propeller blade shaped flow guide ducts 261, there is a fluid exit opening into a common opening 262 of the flow guide device 26, which downstream leads into the valve opening of the first poppet valve whereby the opening location, of the exit openings into the opening 262, is selected in a way that a swirl flow is created downstream of the flow guide ducts 261 in the area of the first poppet valve.

Figure 3B:
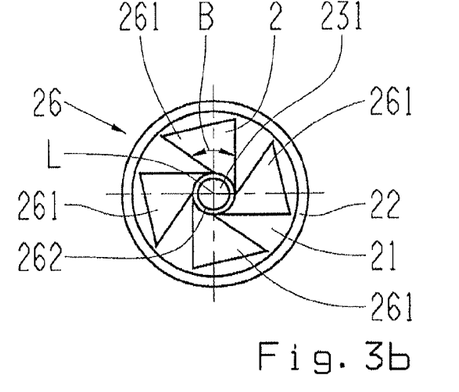

Contrary to the first flow guide device 26 as in FIG. 3a, the flow guide device 26 in FIG. 3b has the propeller shaped flow guide ducts 261, with mainly triangle shaped cross-sections. The corners of the triangles can naturally be also rounded, meaning being provided with an inner radius.

Figure 3C:
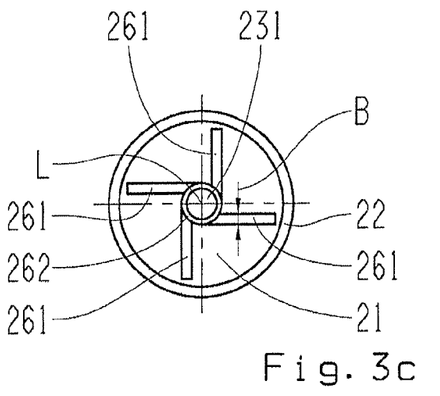

The first flow guide device 26 in FIG. 3c differs from the one in FIG. 3a, in that the flow guide ducts 261 have square shaped cross-sections, here in particular rectangular shape cross-sections. The width B of the flow guide ducts 261 is accordingly constant in the radial direction (perpendicular to the longitudinal axis L). Also in this case, the corners can be rounded.

The second flow guide device 26 in 3d corresponds mainly with the one in FIG. 3a, whereby the flow guide ducts 261, compared to the one in FIG. 3a are, however, spiral shape twisted. That is, this is a radially inner region of the flow guide ducts 261 to a radially outer portion that offset in the direction of the intended rotational direction of the fluid flow/twisted, thereby improving the effect of the swirl-producing flow guide device 26. The flow guide ducts 261 run here in each case (slightly) in a spiral shape towards the opening 262 or rather the first valve opening of the first poppet valve. This design corresponds to the design as shown in FIG. 2 or rather FIG. 2a.

Figure 3D:
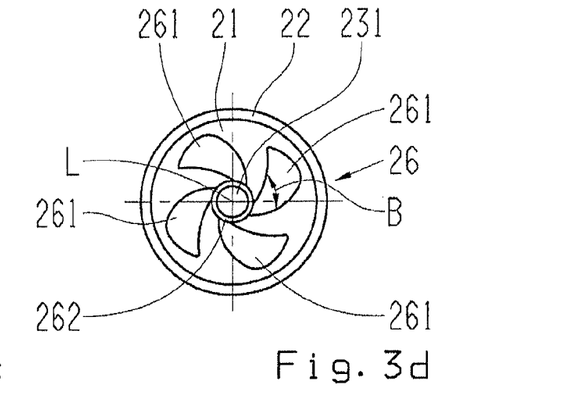
Figure 3E:
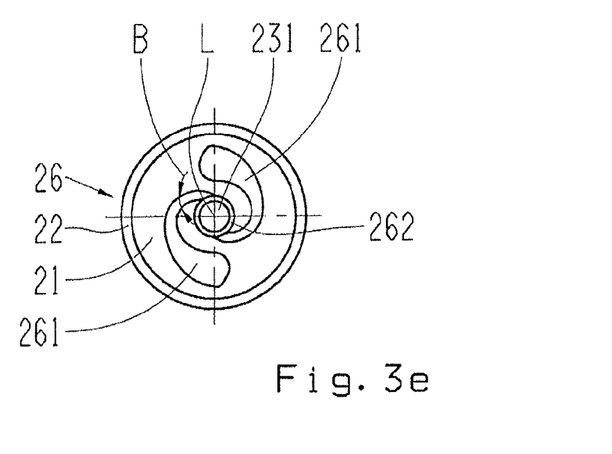

The flow guide ducts 261 of the second flow guide device 26, in accordance with FIG. 3e, as compared to the ones in FIG. 3d have much stronger spiral shape twist. In addition, the second flow guide device 26 has just two flow guide ducts 261.

The flow guide ducts 261, in particular the ones shown in FIGS. 3a to 3e, can be designed as shown in FIG. 1 or 2, as recesses which mainly run along the longitudinal axis L, meaning mainly to the side walls which are directed in parallel to the longitudinal axis L. As an alternative, the flow guide ducts 261 can also be designed as helical in shape and run in particular coaxially around the longitudinal axes L. Instead of two or four, respectively, flow guide ducts 261, of three, five, six, etc. ducts 261 can be provided. A flow guide device 26 with just a flow guide duct 261 is also possible. And equal distribution of the flow guide ducts 261 around the longitudinal axis L, meaning equal distances between the flow guide ducts 261 in the area to direction, is preferred, but not a mandatory provision. In particular, the flow guide ducts 261 are in formed and positioned symmetrically with respect to each other.

The flow guide ducts 261 can also have, as shown in the drawings, elongated exit openings which lead along the entire axial length of the flow guide device 26 in the opening 262. It can also be necessary, that the flow guide ducts 261 just lead in certain areas into the opening 262, to achieve an especially suitable fluid flow. For instance, the flow guide ducts 261 can also just lead into an end area of the flow guide device 26, positioned upstream, in particular in immediate proximity to the valve opening of the first poppet valve and the opening 262, to achieve an especially good swirling effect.

REFERENCE CHARACTERS

1 Electromagnet Part
10 Valve Device
11 Housing
12 Magnetic Coil
13 Magnetic Yoke
131 Dipping Step
132 Magnet Control Edge
14 Magnet Armature
141 Armature Rod
142 Armature Body
143 Anti-stick Washer
15 Spring Element
16 Pre-load Element
17 Contact Device
18 Bearing
19 Pole Pipe
2 Valve Part
21 Housing
22 Filter Cage
221 Filter
222 Plug
23, 24 Poppet Valve
231, 241 Closure body
232, 242 Valve Orifice
233, 243 Valve Control edge/Valve Control Surface
234, 244 Valve Opening
25 Push Rod
26, 28 Flow Guide Device
261, 281 Flow Guide Duct
28A, 28B Areas
262 Opening
27 Intermediate Space
A First Outflow Area (Operation Pressure Connection or area, respectively)
AA Section
BB Section
B Width of a Flow Guide Duct 261
$D_k$ Diameter
$D_{max}$ Diameter
$D_{min}$ Diameter
$D_v$ Diameter
I Inner Space
$L_I$ Length of the inner space
P Inflow Area
S Section Cut Plane
T second outflow area (Tank Port or Area, respectively)
t Dipping Depth
ALPHA Opening Angle
BETA Angle Valve Control edge
GAMMA Cone Angle
DELTA Narrowing Angle

The invention claimed is:

1. A valve device for a fluid comprising:
at least one inflow area (P),
first and second outflow areas (A, T) which are connected with one another with regard to flow via first and second poppet valves (23, 24) that are coupled to one another and aligned with each other along an axis of the valve device,
the first poppet valve (23), which is positioned between the first and the second outflow areas (A, T), being adjustable,
the second poppet valve (24) being designed as a cone poppet valve with a cone shaped closure body (241),
a flow guide device (28) being positioned, between the first and the second outflow areas (A, T) and upstream of the second poppet valve (24), the flow guide device having a first area which provides fluid flowing in a direction of the second poppet valve (24) with a swirl, and the flow guide device has a second area with an inner wall that forms an inner space which narrows downstream and is rotationally symmetric, and the inner wall is curved radially outward with respect to the axis of the valve device, and
the closure body (241), of the second poppet valve (24), has a cone angle (GAMMA) of 60°+/−10° to reduce pressure fluctuations in the hydraulic pressure control valve as the fluid flows therethrough.

2. The valve device according to claim 1, wherein the first area of the flow guide device (28) has several flow guide ducts (281) which are separated from one another and which are designed to provide the fluid, which flows in the direction of the second poppet valve (24) with a swirl, and the inner space of the second aria of the flow guide device (28) is designed such that the fluid which has been provided with a swirl through the first area (28A) is guided to the second poppet valve (24) and a ratio ($D_{max}/D_{min}$) between a diameter ($D_{max}$) of the inner space (I), at exit openings of the flow guide ducts (281), and a minimal diameter ($D_{min}$) of the inner space (I), at the second poppet valve (24), is 1.5+/−0.1.

3. The valve device according to claim 1, wherein the first area of the flow guide device (28) has several duct areas (281) which are separated from one another and which are designed such that they provide the fluid which flows in the direction of the second poppet valve (24), with a swirl, and the inner space of the second area of the flow guide device (28) is designed such that the fluid, which is provided with a swirl by the first area (28A), is guided to the second poppet valve (24), and a narrowing angle (DELTA) of the narrowing inner space (I) is 45+/−10° at an end positioned downstream.

4. The valve device according to claim 1, wherein the first area of the flow guide device (28) has several duct areas (281) that are separated from one another and which are designed such that the several duct areas (281) provide a swirl to the fluid which flows in the direction of the second poppet valve (24), and the inner space of the second area of the flow guide device (28) is designed such that the fluid, which is provided with a swirl through the first area (28A), is guided to the second poppet valve (24), and a ratio ($L_I/D_{min}$) between an axial length ($L_I$) of the narrowing inner space (I) and a minimal diameter ($D_{min}$) of the inner space (I) is 0.6 to 0.8 at the second poppet valve (24).

5. The valve device according to claim 1, wherein the first area of the flow guide device (28) has several duct areas (281) that are separated from one another and which are designed such that the several duct areas (281) provide the fluid, which flows in the direction of the second poppet valve (24), with a swirl, and the first and the second areas (28A, 28B) of the flow guide device are each a component and at least one of these components (28A, 28B) has a cone shaped area (A1, A2) which is designed such that the component of the first area (28A) of the flow guide device is aligned in at least one predefined radial axis of the flow guide device (28) with the component of the second area (28B) of the flow guide device.

6. The valve device according to claim 1, wherein a second flow guide device (26) is positioned, in the inflow area (P) upstream of the first poppet valve (23), and is designed so that the second flow guide device (26) provides the inflow of fluid in the area of the first poppet valve (23) with a swirl.

7. The valve device according to claim 1, wherein the first and a second flow guide devices (26, 28) are designed such that the swirl of the fluid flow through the first poppet valve (23), and the swirl of the fluid flow through the second poppet valve (24) have a common rotational direction.

8. The valve device according to claim 1, further comprising a proportional electro-magnet (12, 13, 14) for actuating a closure body of the first poppet valve (23) and the second poppet valve (24).

9. A hydraulic pressure control valve in combination with a motor vehicle transmission, the hydraulic pressure control valve comprising at least one inflow area (P) and first and second outflow areas (A, T) which are connected with one another with regard to flow via first and second poppet valves (23, 24) that are coupled to each other and aligned along an axis of the hydraulic pressure control valve, the first poppet valve (23), which is positioned between the first and the second outflow areas (A, T), being adjustable, the second poppet valve (24) being designed as a cone poppet valve with a cone shaped closure body (241), a flow guide device (28) is positioned upstream of the second poppet valve (24), between the first and the second outflow areas (A, T), and has an upstream portion and a downstream portion, the upstream portion is designed to provide a swirl of fluid which flows in a direction of the second poppet valve (24), and the downstream portion has an inner wall that defines an inner space which narrows downstream and is rotationally symmetric, and the inner wall is curved radially outward with respect to the axis of the hydraulic pressure control valve, and a closure body (241) of the second poppet valve (24) has a cone angle (GAMMA) of 60°+/−10°.

10. A valve device for a fluid comprising:

at least one inflow area (P), first and second outflow areas (A, T) which are connected with one another with regard to flow via first and second poppet valves (23, 24) that are coupled to one another, the first poppet valve (23), which is positioned between the first and the second outflow areas (A, T), being adjustable, the second poppet valve (24) being designed as a cone poppet valve with a cone shaped closure body (241), a flow guide device (28) being positioned, between the first and the second outflow areas (A, T) and upstream of the second poppet valve (24), and being designed to provide a swirl of fluid which flows in a direction of the second poppet valve (24), the closure body (241), of the second poppet valve (24), has a cone angle (GAMMA) of 60°+/−10°, and a second flow guide device (26) is positioned, in the inflow area (P) upstream of the first poppet valve (23), and designed so that the second flow guide device (26) provides the inflow in fluid in the area of the first poppet valve (23) with a swirl.

\* \* \* \* \*